(12) United States Patent
Spangler

(10) Patent No.: US 11,852,036 B1
(45) Date of Patent: Dec. 26, 2023

(54) AIRFOIL SKIN PASSAGEWAY COOLING ENHANCEMENT

(71) Applicant: Raytheon Technologies Corporation, Farmington, CT (US)

(72) Inventor: Brandon W. Spangler, Vernon, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/136,567

(22) Filed: Apr. 19, 2023

(51) Int. Cl.
  *F01D 5/18* (2006.01)

(52) U.S. Cl.
  CPC ........ *F01D 5/187* (2013.01); *F05D 2240/305* (2013.01); *F05D 2240/306* (2013.01); *F05D 2260/202* (2013.01); *F05D 2260/22141* (2013.01)

(58) Field of Classification Search
  CPC ........... F01D 5/187; F05D 2260/22141; F05D 2230/21; F05D 2230/211; B22F 5/04
  See application file for complete search history.

(56) References Cited

U.S. PATENT DOCUMENTS

| | | | |
|---|---|---|---|
| 5,720,431 A * | 2/1998 | Sellers | F01D 5/186 416/96 A |
| 7,625,178 B2 | 12/2009 | Morris et al. | |
| 9,115,590 B2 | 8/2015 | Spangler et al. | |
| 9,988,913 B2 | 6/2018 | Spangler | |
| 10,252,328 B2 | 4/2019 | Propheter-Hinckley | |
| 10,533,427 B2 * | 1/2020 | Marsh | F01D 5/147 |
| 10,731,474 B2 | 8/2020 | Kohli et al. | |
| 11,286,793 B2 | 3/2022 | Spangler et al. | |
| 11,480,059 B2 * | 10/2022 | Spangler | F01D 5/188 |
| 2011/0094698 A1 | 4/2011 | Grunstra | |
| 2014/0093392 A1 | 4/2014 | Tibbott et al. | |
| 2017/0335692 A1 | 11/2017 | King et al. | |
| 2019/0024515 A1 * | 1/2019 | Marsh | F01D 5/147 |
| 2021/0140323 A1 * | 5/2021 | Spangler | F01D 5/147 |
| 2021/0148235 A1 * | 5/2021 | Spangler | F01D 5/147 |

* cited by examiner

*Primary Examiner* — Eldon T Brockman
(74) *Attorney, Agent, or Firm* — Bachman & LaPointe, P.C.

(57) ABSTRACT

An airfoil element has first and second ribs each connecting the pressure side and the suction side. Each of the first and second ribs define: a tube portion circumscribing a rib passage; and first and second connector arms joining the tube portion to, respectively, the pressure side and the suction side. The first rib, the second rib, and the airfoil wall bound a continuous cooling channel having a pressure side portion to the pressure side of the mean line and a suction side portion to the suction side of the mean line. At least one of the pressure side portion and the suction side portion includes a skin passageway between at least one of the respective tube portions of the first rib and second rib and an adjacent portion of an interior surface of the airfoil wall. The skin passageway has an outer surface formed by the adjacent portion and an inner surface formed by said at least one of the respective tube portions. At least one of the outer surface and the inner surface has a plurality of protrusions into the skin passageway.

21 Claims, 10 Drawing Sheets

AIRFOIL SKIN PASSAGEWAY COOLING ENHANCEMENT

BACKGROUND

The disclosure relates to gas turbine engines. More particularly, the disclosure relates to cooled airfoil elements (namely blades and vanes).

Gas turbine engines (used in propulsion and power applications and broadly inclusive of turbojets, turboprops, turbofans, turbo shafts, industrial gas turbines, and the like) cooled airfoil elements.

US2021/0140323A1, May 13, 2021, to Spangler et al., and entitled "Airfoil with Ribs Defining Shaped Cooling Channel", (the '323 publication) the disclosure of which is incorporated by reference herein in its entirety as if set forth at length, discloses cast airfoils having a cast outer wall and inner walls unitarily cast therewith. The inner walls each define a respective associated spanwise cavity or passageway having an interior surface Each of the inner walls has an exterior surface generally spaced apart from the interior surface of the outer wall and the exterior surface(s) of adjacent inner wall(s). Each inner wall is connected to the outer wall by a single connector web or arm at the suction side and a single connector web or arm at the pressure side. Apertures in the inner walls may vent cooling air to one or more spaces between the outer wall and inner walls. Apertures in the outer wall may form outlets such as film cooling outlets and trailing edge discharge slot outlets. The positioning of the various webs and holes in the inner walls can create circuits that provide both a streamwise/chordwise distribution of flow along the outer wall interior surface and provide flow from one spanwise passageway/cavity to another.

U.S. Pat. No. 9,115,590B2, Aug. 25, 2015, to Spangler et al., and entitled "Gas Turbine Engine Airfoil Cooling Circuit", (the '590 patent), the disclosure of which is incorporated by reference herein in its entirety as if set forth at length, discloses skin cavities formed by skin cores and having various surface enhancements.

U.S. patent Ser. No. 10/252,328B2, Apr. 9, 2019, to Propheter-Hinckley, and entitled "Ceramic and Refractory Metal Core Assembly", (the '328 patent), the disclosure of which is incorporated by reference herein in its entirety as if set forth at length, discloses alternative skin cavities.

U.S. Pat. No. 9,988,913B2, Jun. 5, 2018, to Spangler, and entitled "Using Inserts to Balance Heat Transfer and Stress in High Temperature Alloys" (the '913 patent), the disclosure of which is incorporated by reference herein in its entirety as if set forth at length, discloses a multipiece airfoil wherein an outer wall is separately formed from a plurality of inserts that form inner walls. The inserts include various surface enhancements which protrude into passageways between the associated inner wall and the outer wall.

SUMMARY

One aspect of the disclosure involves an airfoil element comprising: an airfoil wall defining a leading end, a trailing end, a pressure side, a suction side, and a mean line from the leading end to the trailing end that is equidistant from the pressure side and the suction side; and first and second ribs each connecting the pressure side and the suction side. Each of the first and second ribs define: a tube portion circumscribing a rib passage; and first and second connector arms joining the tube portion to, respectively, the pressure side and the suction side. The first rib, the second rib, and the airfoil wall bound a continuous cooling channel therebetween, the continuous cooling channel having a pressure side portion to the pressure side of the mean line and a suction side portion to the suction side of the mean line. At least one of the pressure side portion and the suction side portion includes a skin passageway between at least one of the respective tube portions of the first rib and second rib and an adjacent portion of an interior surface of the airfoil wall. The skin passageway has an outer surface formed by said adjacent portion and an inner surface formed by said at least one of the respective tube portions. At least one of the outer surface and the inner surface has a plurality of protrusions into the skin passageway.

In a further embodiment of any of the foregoing embodiments, additionally and/or alternatively: the tube portion of at least one of the first and second ribs has fore and aft tube wall sections, a pressure side tube wall section, and a suction side tube wall section forming a rounded-corner quadrilateral shape in cross-section; and/or the tube portion of each of the first and second ribs has a pressure side tube wall section, a suction side tube wall section, and an additional section linking the pressure side section and the suction side section, the additional section of the first rib tube portion and the additional section of the second rib tube portion facing each other.

In a further embodiment of any of the foregoing embodiments, additionally and/or alternatively, the outer surface and the inner surface each have said plurality of protrusions into the skin passageway internested so that ends of the outer surface protrusions extend into the airfoil deeper than ends of adjacent inner surface protrusions.

In a further embodiment of any of the foregoing embodiments, additionally and/or alternatively, the skin passageway is a suction side said skin passageway of the suction side portion and the pressure side portion has a pressure side said skin passageway.

In a further embodiment of any of the foregoing embodiments, additionally and/or alternatively, the suction side skin passageway is between the tube portion of the first rib and the airfoil wall and the pressure side skin passageway is between the tube portion of the second rib and the airfoil wall.

In a further embodiment of any of the foregoing embodiments, additionally and/or alternatively, the airfoil element further comprises at least one film cooling outlet hole through the airfoil wall from the second skin passageway portion.

In a further embodiment of any of the foregoing embodiments, additionally and/or alternatively, the pressure side portion and the suction side portion are each of L-shaped cross-section streamwise oppositely directed feet of the L-shaped cross section respectively form the pressure side skin passageway and suction side skin passageway; and legs of the L-shaped cross-section join each other to form a linking portion linking the pressure side skin passageway and suction side skin passageway between the tube portions of the first and second ribs.

In a further embodiment of any of the foregoing embodiments, additionally and/or alternatively, the airfoil element further comprises at least one feed hole through the tube portion of the first rib to the continuous cooling channel.

In a further embodiment of any of the foregoing embodiments, additionally and/or alternatively, the airfoil element further comprises at least one film cooling outlet hole through the airfoil wall from the continuous cooling channel.

In a further embodiment of any of the foregoing embodiments, additionally and/or alternatively, the airfoil element further comprises at least one feed hole through the tube portion of the second rib from the continuous cooling channel.

In a further embodiment of any of the foregoing embodiments, additionally and/or alternatively, the airfoil element is a blade having: a root; and a platform between the root and the airfoil.

In a further embodiment of any of the foregoing embodiments, additionally and/or alternatively, a gas turbine engine includes a plurality of the airfoil elements in a turbine section and further comprises: a compressor section; a combustor in fluid communication with the compressor section; and said turbine section in fluid communication with the combustor.

In a further embodiment of any of the foregoing embodiments, additionally and/or alternatively, a method for manufacturing the airfoil element comprises assembling a first casting core to one or more feedcores wherein: the first casting core has: a first section for casting the skin passageway and a second section for casting portions of the continuous cooling channel between the respective tube portions of the first rib and the second rib; and a plurality of recesses in the first section. The method further comprises: overmolding a sacrificial pattern material to an assembly of the first casting core and the one or more feedcores; shelling the overmolded casting core assembly to form a shell; and casting alloy in the shell. During the casting the plurality of recesses cast the plurality of protrusions.

In a further embodiment of any of the foregoing embodiments, additionally and/or alternatively, the method further comprises: molding the first casting core and the one or more feedcores; removing the sacrificial pattern material before the casting; and deshelling and decoring after the casting.

In a further embodiment of any of the foregoing embodiments, additionally and/or alternatively, a method for using the airfoil element comprises: passing an airflow into the continuous cooling channel; and passing an outlet airflow from the continuous cooling channel through a film cooling outlet in the airfoil wall.

In a further embodiment of any of the foregoing embodiments, additionally and/or alternatively, the method of \ further comprised passing an airflow from the continuous cooling channel to the second rib's rib passage.

In a further embodiment of any of the foregoing embodiments, additionally and/or alternatively, the passing an airflow into the continuous cooling channel from the first rib's rib passage.

A further aspect of the disclosure involves an airfoil element comprising: an airfoil wall defining a leading end, a trailing end, a pressure side, a suction side, and a mean line from the leading end to the trailing end that is equidistant from the pressure side and the suction side; a plurality of main body passageways along the mean line. The airfoil element has a plurality of cooling passageways each having: a pressure side skin passageway; a suction side skin passageway; and a linking portion between and linking the pressure side skin passageway and the suction side skin passageway and between two of the main body passageways. A surface of at least one of the pressure side skin passageway and the suction side skin passageway has a plurality of protrusions.

In a further embodiment of any of the foregoing embodiments, additionally and/or alternatively, the surface is opposite an inner surface of the airfoil wall.

In a further embodiment of any of the foregoing embodiments, additionally and/or alternatively, the surface is an inner surface of the airfoil wall.

A further aspect of the disclosure involves, a casting core assembly for casting an airfoil element, the airfoil element comprising: an airfoil wall defining a leading end, a trailing end, a pressure side, a suction side, and a mean line from the leading end to the trailing end that is equidistant from the pressure side and the suction side. The casting core assembly has: one or more feedcores each having one or more spanwise legs for casting main body passages along the mean line; and a first casting core. The first casting core has: a first section for casting a skin passageway of a cooling channel; and a second section for casting a portion of the cooling channel between two of the main body passages; and a plurality of recesses in the first section.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
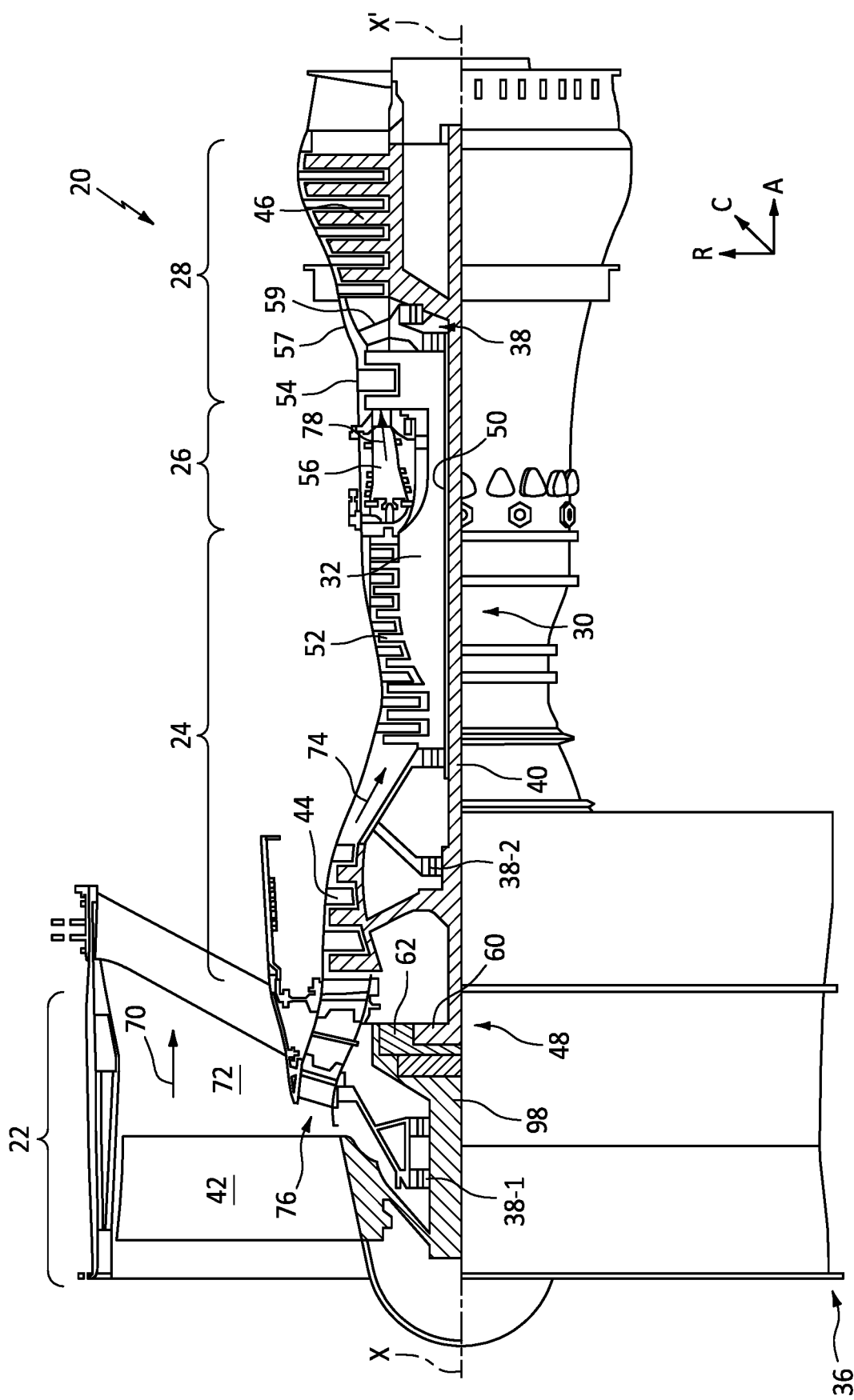
FIG. 1 is a cross-sectional view of an example gas turbine engine, in accordance with various embodiments.

With reference to FIG. 1, a gas turbine engine 20 is provided. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction. An A-R-C axis is shown throughout the drawings to illustrate the relative position of various components.

The gas turbine engine 20 may be a two-spool turbofan that generally incorporates a fan section 22, a compressor section 24, a combustor section 26 and a turbine section 28. In operation, the fan section 22 drives air (bypass air flow) 70 along a bypass flow-path 72 while the compressor section 24 drives air (air flow) 74 along a core flow-path 76 for compression and communication into the combustor section 26 (for mixing with fuel and combusting) then expansion of the combustion gas 78 through the turbine section 28. Although depicted as a turbofan gas turbine engine 20 herein, it should be understood that the concepts described herein are not limited to use with turbofans as the teachings may be applied to other types of turbine engines including three-spool architectures and turboshaft or industrial gas turbines with one or more spools.

The example gas turbine engine 20 generally comprise a low speed spool 30 and a high speed spool 32 mounted for rotation about an engine central longitudinal axis X-X' relative to an engine static structure 36 via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 generally includes an inner shaft 40 that interconnects a fan 42, a low pressure (or first) compressor section 44 and a low pressure (or second) turbine section 46. The inner shaft 40 is connected to the fan 42 through a geared architecture 48 that can drive the fan shaft 98, and thus the fan 42, at a lower speed than the low speed spool 30. The geared architecture 48 includes a gear assembly 60 enclosed within a gear housing 62. The gear assembly 60 couples the inner shaft 40 to a rotating fan structure.

The high speed spool 32 includes an outer shaft 50 that interconnects a high pressure (or second) compressor section 52 and the high pressure (or first) turbine section 54. A combustor 56 is located between the high pressure compressor 52 and the high pressure turbine 54. A mid-turbine frame 57 of the engine static structure 36 is located generally between the high pressure turbine 54 and the low pressure turbine 46. The mid-turbine frame 57 supports one or more bearing systems 38 in the turbine section 28. The inner shaft 40 and the outer shaft 50 are concentric and rotate via the bearing systems 38 about the engine central longitudinal axis X-X', which is collinear with their longitudinal axes. As used herein, a "high pressure" compressor or turbine experiences a higher pressure than a corresponding "low pressure" compressor or turbine.

The core airflow is compressed by the low pressure compressor section 44 then the high pressure compressor 52, mixed and burned with fuel in the combustor 56, then the resulting combustion gas 78 is expanded over the high pressure turbine 54 and the low pressure turbine 46. The mid-turbine frame 57 includes airfoils 59 which are in the core flow path. The turbines 46, 54 rotationally drive the respective low speed spool 30 and high speed spool 32 in response to the expansion.

The gas turbine engine 20 is a high-bypass ratio geared aircraft engine. The bypass ratio of the gas turbine engine 20 may be greater than about six (6). The bypass ratio of the gas turbine engine 20 may also be greater than ten (10:1). The geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). The diameter of the fan 42 may be significantly larger than that of the low pressure compressor section 44, and the low pressure turbine 46 may have a pressure ratio that is greater than about five (5:1). The pressure ratio of the low pressure turbine 46 is measured prior to an inlet of the low pressure turbine 46 as related to the pressure at the outlet of the low pressure turbine 46. It should be understood, however, that the above parameters are examples of various embodiments of a suitable geared architecture engine and that the present disclosure contemplates other turbine engines including direct drive turbofans.

In an example high bypass turbofan implementation, a significant amount of thrust is provided by the bypass flow due to the high bypass ratio. The fan section 22 of the example engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ("TSFC")"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment can be less than or equal to 1.45, or more narrowly greater than or equal to 1.25, such as between 1.30 and 1.40. "Low corrected fan tip speed" is the actual fan tip speed in ft/sec divided by an industry standard temperature correction of $[(\text{Tram }° R)/(518.7° R)]^{0.5}$. The "low corrected fan tip speed" can be less than or equal to 1150.0 ft/second (350.5 meters/second), and greater than or equal to 1000.0 ft/second (304.8 meters/second).

The next generation turbofan engines are designed for higher efficiency and use higher pressure ratios and higher temperatures in the high pressure compressor 52 than are conventionally experienced. These higher operating temperatures and pressure ratios create operating environments that cause thermal loads that are higher than the thermal loads conventionally experienced, which may shorten the operational life of current components.

Figure 2:
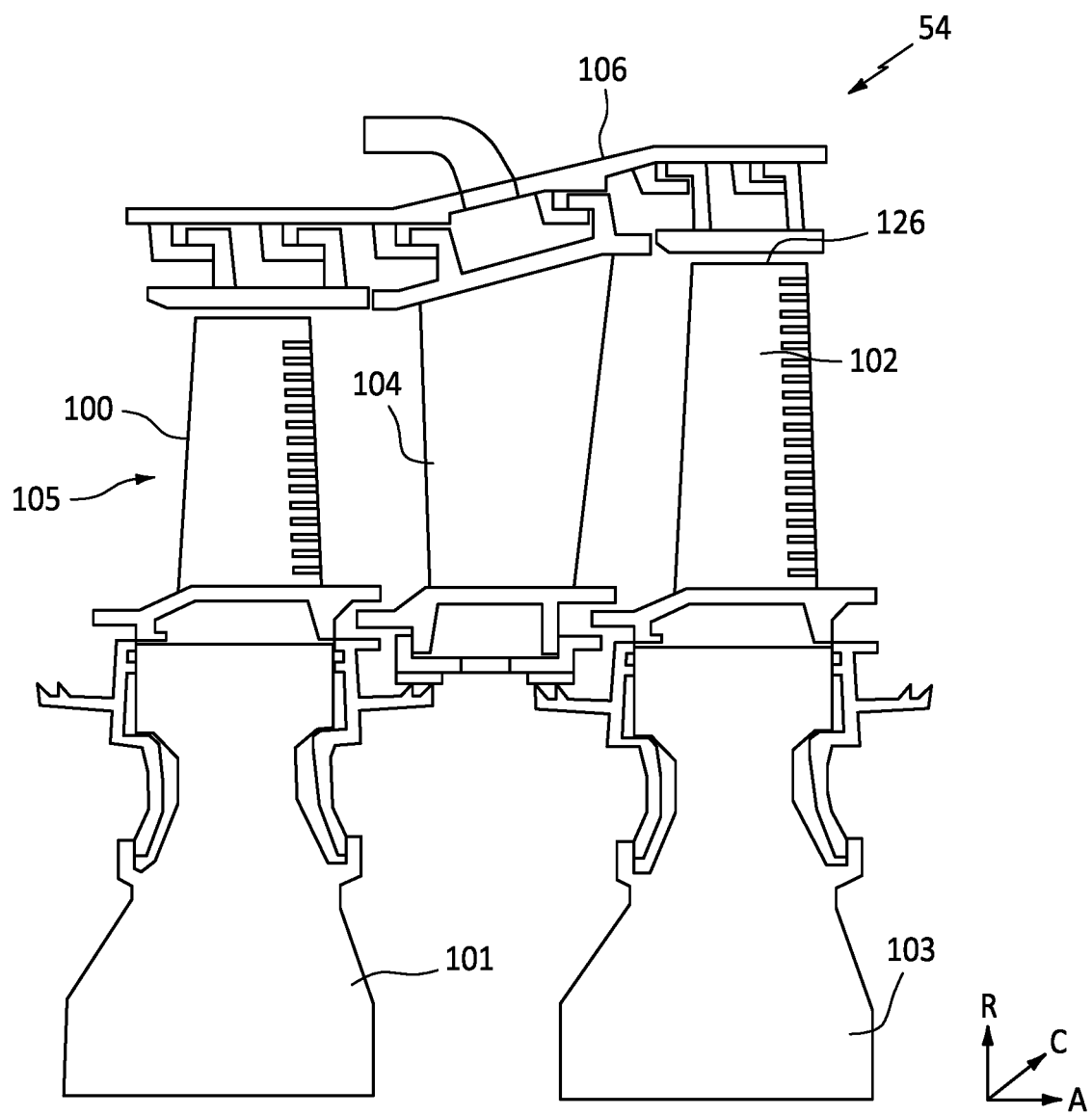
FIG. 2 is a cross-sectional view of a portion of a high pressure turbine section of the gas turbine engine of FIG. 1, in accordance with various embodiments.

Referring now to FIGS. 1 and 2, the high pressure turbine section 54 may include multiple blades 105 including multiple rows, or stages, of blades including a first blade 100 and a second blade 102, along with rows, or stages, of vanes located therebetween including a vane 104. The blades 100, 102 may be coupled to disks 101, 103 respectively which facilitate rotation of the blades 100, 102 about the axis X-X'. The vane 104 may be coupled to a case 106 and may remain stationary relative to the axis X-X'.

The blade 102 may include an inner diameter (ID) end/edge 108 (FIG. 3—e.g., an attachment root ID end/face) and an outer diameter (OD) end/edge 126 (e.g., a blade/airfoil tip) Due to relatively high temperatures within the high pressure turbine section 54, it may be desirable for the blade 102 (and the vane 104) to receive a flow of cooling air. In that regard, the blade 102 may receive a cooling airflow from the inner diameter edge 108 (or the outer diameter end/edge (e.g., an OD shroud) for a vane). The blade 102 may define cavities that transport the cooling airflow through the blade 102 to the other of the inner diameter edge 108 or the outer diameter edge 126 and/or ports along the airfoil and platform or shroud.

Improved cooling passages (passageways) will be described throughout the disclosure with reference to the blade 102. However, one skilled in the art will realize that the cooling passage design implemented in the blade 102 may likewise be implemented in the vane 104, or any airfoil (including a rotating blade or stationary vane) in any portion of the compressor section 24 or the turbine section 28.

Figure 3:
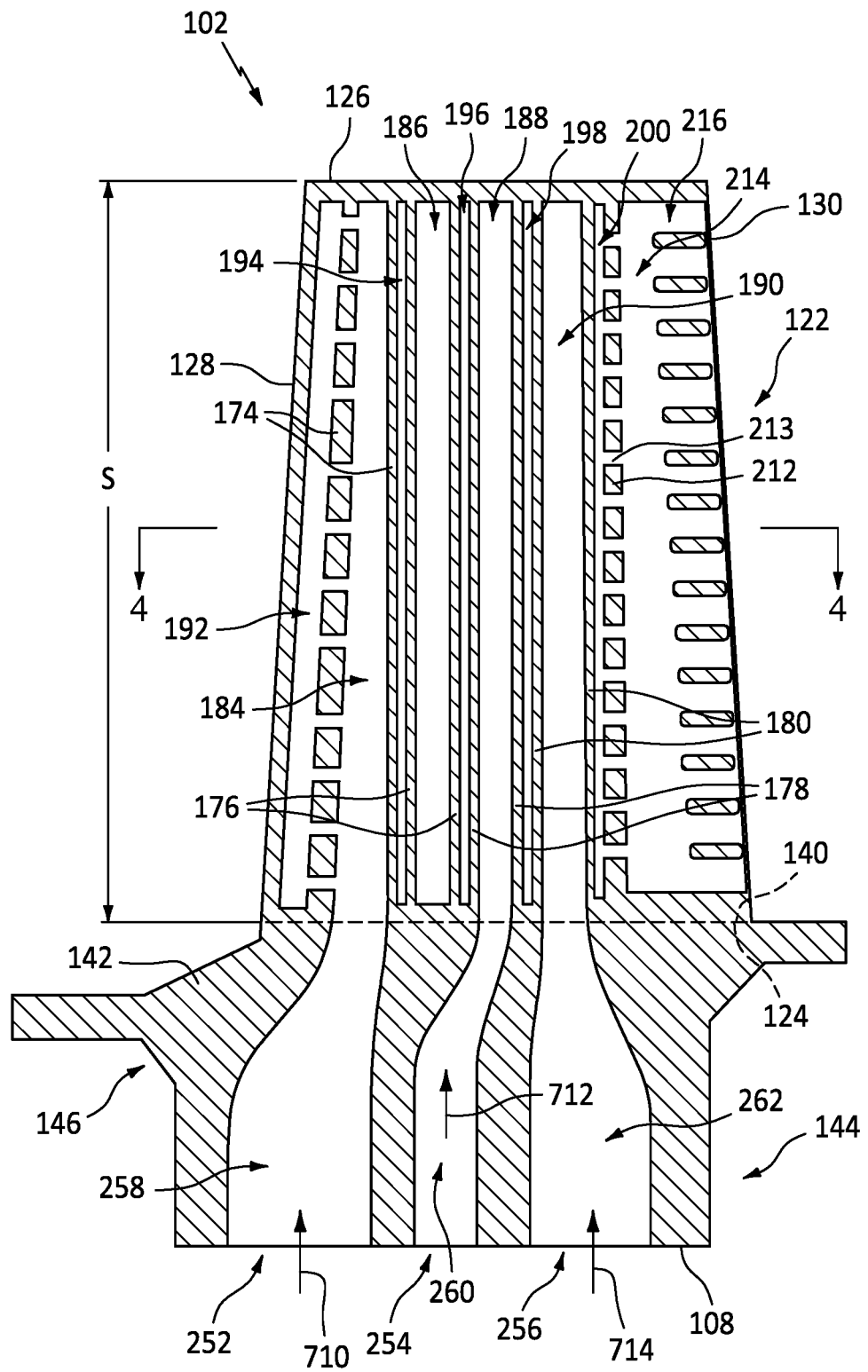
FIG. 3 is a schematic side view of a turbine blade for the high pressure turbine section of FIG. 2.

Turning now to FIG. 3, an engine turbine element 102 is illustrated as a blade (e.g., a high pressure turbine (HPT) blade) having an airfoil 122 which extends between an inboard end 124, and an opposing outboard end 126 (e.g., at a free tip), a spanwise distance or span S therebetween extending substantially in the engine radial direction. The airfoil also includes a leading edge or end 128 and an opposing trailing edge or end 130. A pressure side 132 (FIG. 4) and an opposing suction side 134 extend between the leading edge 128 and trailing edge 130.

The airfoil inboard end is disposed at the outboard surface 140 (FIG. 3) of a platform 142. An attachment root 144 (e.g., firtree) extends radially inward from the underside 146 of the platform.

The example turbine blade is cast of a high temperature nickel-based superalloy, such as a Ni-based single crystal (SX) superalloy (e.g., cast and machined). As discussed further below, an example of a manufacturing process is an investment casting process wherein the alloy is cast over a shelled casting core assembly (e.g., molded ceramic casting cores optionally with refractory metal core (RMC) components). Example ceramics include alumina and silica (e.g., at least 50% by weight silica and/or alumina). The cores may be fired post-molding/pre-assembly. An example investment casting process is a lost wax process wherein the core assembly is overmolded with wax in a wax die to form a pattern for the blade. The pattern is in turn shelled (e.g., with a ceramic stucco). The shelled pattern (not shown) is dewaxed and hardened (e.g., a steam autoclave dewax followed by kiln hardening or a kiln hardening that also vaporizes or volatilizes the wax). Thereafter, open space in the resulting shell casts the alloy.

The blade may also have a thermal barrier coating (TBC) system (not shown) along at least a portion of the airfoil. An example coating covers the airfoil pressure and suction side surfaces and the gaspath-facing surfaces of the platform. An example coating comprises a metallic bondcoat (e.g., MCrAlY, e.g., thermal sprayed or cathodic arc sprayed) and one or more layers of ceramic (e.g., a YSZ and/or GSZ, e.g., thermal sprayed and/or vapor deposited such as EB-PVD).

Figure 4:
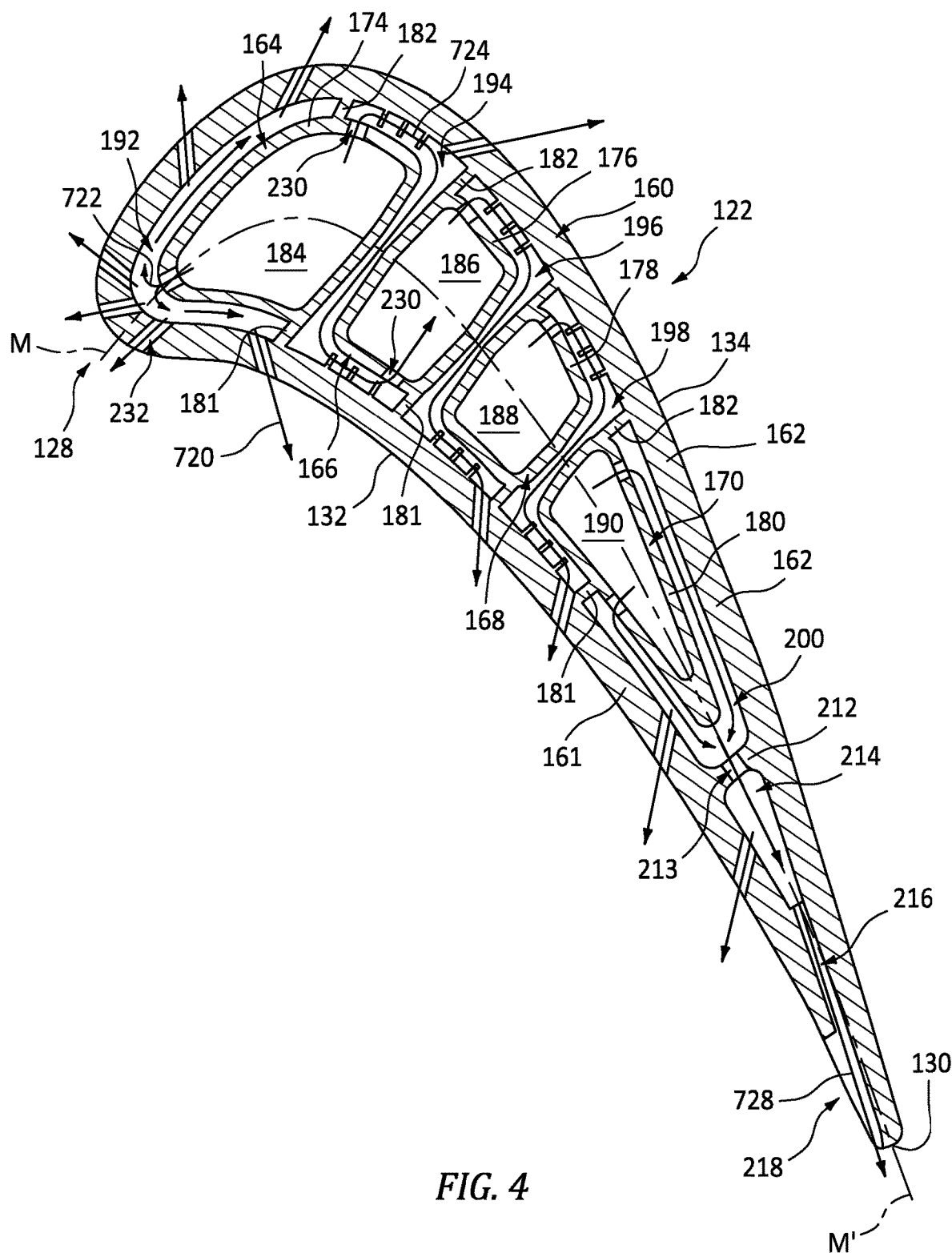
FIG. 4 is a transverse (generally tangential to the engine centerline) sectional view of an airfoil of the turbine blade of FIG. 3 shown as an axial flow blade in operation with airflow.

FIG. 4 is a cross-sectional view of the airfoil of the "axial flow" blade in operation with airflow. Alternative airfoil elements using such a cross-section may be vanes.

The airfoil 122 includes an (outer) airfoil wall 160 that spans in a radial direction and delimits the aerodynamic profile of the airfoil 122 in the engine gaspath. In this regard, the wall 160 defines the leading end/edge 128, a trailing end/edge 130, and pressure 132 and suction 134 sides that join the leading end 128 and the trailing end 130. A camber or mean line (M') extends from the leading end 128 to the trailing end 130. All locations on the mean line (M') are equidistant from the sides 132,134 (in a perpendicular direction to the mean line at the location). For purposes of this disclosure, elements, regions, or portions thereof that are below the mean line (M') in FIG. 4 are considered to be on the pressure side, and elements, regions, or portions thereof that are above the mean line (M-M') in FIG. 4 are considered to be on the suction side (e.g. a suction side connector arm or a suction side wall discussed below). The airfoil wall 160 includes a pressure side portion 161 (pressure side wall) and a suction side portion 162 (suction side wall). These portions 161,162 merge adjacent the leading edge and toward the trailing edge.

The airfoil 122 further includes a plurality of ribs 164, 166, 168, 170. The rib 164 located toward the leading end 128 in FIG. 4 is a leading rib, and the rib 170 located toward the trailing end 130 in FIG. 4 is a trailing rib. The terminology "first" and "second" is to differentiate that there are two architecturally distinct ribs. It is to be understood that the terms "first" and "second" are interchangeable and that the first rib could alternatively be termed as the second rib and that the second rib could alternatively be termed as the first rib, provided the ribs are adjacent one another. The ribs 166 and 168 are first and second intermediate ribs, respectively, with the first being ahead of the second.

Each rib 164, 166, 168, 170 connects the pressure and suction sides (side sections or portions) 161,162 of the airfoil wall 160. Each rib is generally longitudinally (spanwise for the airfoil and generally radially for the engine) elongate between an inner diameter and outer diameter such that it spans the full or substantially full longitudinal distance/span S (FIG. 3) of the airfoil wall 160. The term substantially full refers to at least 70% of the longitudinal distance between the inner diameter and outer diameter of the airfoil.

Each rib defines a tube portion (tube) 174, 176, 178, 180 having an interior/inner surface that circumscribes a rib passage (passageway) 184, 186, 188, 190. The tube portions 174, 176, 178 are generally of simple rounded-corner convex quadrilateral shape but most typically will be rectangular. The tube portion 180 is of similarly rounded-corner triangular sectional planform.

Connector arms 181 (pressure side) and 182 (suction side) of the ribs join the tube portions to the pressure and suction sides 161 and 162 of the airfoil wall. Each tube portion is solely joined to the pressure side by a single connector arm 181 and solely joined to the suction side by a single connector arm 182. As used herein, the phrase "solely join" or variations thereof refers to a single pressure side connector arm being the exclusive structural attachment of the tube portion to the pressure side 161 and a single connector arm being the exclusive structural attachment of the tube portion to the suction side 162.

Exclusive of any cooling or other apertures, each connector arm 181, 182 is a solid, continuous wall (e.g., exclusive of said holes at least 60% of the longitudinal (spanwise) distance between the inner diameter and outer diameter of the airfoil and at least an example 80% of the longitudinal distance of the rib). Except for connection through the connector arms to the airfoil wall, the ribs are disjoined from each other. As used herein, the term "disjoined" refers to the ribs excluding any structural attachments to each other. Such an attachment configuration permits each rib to reinforce the sides 161,162 and facilitate reduction in bulging from internal pressure, while still permitting the ribs to move and thermally expand and contract at a different rate than the sides during thermal cycling and without interference from adjacent ribs.

Additionally, FIG. 4 shows narrow spanwise passages formed as continuous cooling channels adjacent the rib passages 184, 186, 188, 190. FIG. 4 shows these as: a leading edge (LE) cooling channel 192 that wraps around the leading tubular portion 174 forming a skin passageway; a first Z-sectioned cooling channel 194 partially between the leading tubular portion 174 and the first intermediate tubular portion 176; a second Z-sectioned cooling channel 196 partially between the first 176 and second 178 intermediate tubular portions; a third Z-sectioned cooling channel 198 partially between the second intermediate portion 178 and the trailing tubular portion 180; and a trailing V-sectioned cooling channel 200 that wraps around and is fed from the trailing tubular portion 180 to form a skin passageway. Each of these example cooling channels (passageway) 192, 194, 196, 198, 200 is bounded at ends by surfaces of two or more adjacent connector arms 181, 182 and between the ends by exterior surfaces of one or two of the rib tubular portions and the interior surface of the airfoil wall (with the exception of a trailing boundary of the trailing skin cooling channel 200). The cooling channels are continuous in that they span the adjacent ribs and airfoil wall surface without any partitions.

As is discussed below, the trailing cooling channel 200 has respective pressure side and suction side sections extending forward/upstream (along the gaspath) at the pressure and suction side, respectively. These sections meet at a junction bounded at a trailing end by a wall 212 (having ports 213) joining the pressure side and suction side. The wall 212 separates the trailing cooling channel 200 from a trailing edge plenum 214 which, in turn, feeds a discharge slot 216 having outlets 218 along a trailing region of the pressure side 132 extending to at or adjacent the trailing edge 130.

The example cooling channels 194, 196, and 198 are identified as Z-passageways in that each includes, in section, a pressure side portion (pressure side skin passage/passageway portion), a suction side portion (suction side skin passage/passageway portion), and a connecting/linking portion therebetween which spans the camber/median line between the two adjacent tubular portions. Thus, each of the pressure side portion and suction side portion has a respective exterior surface formed by the interior surface of the pressure side wall 161 and suction side wall 162, respectively; and an interior surface formed by the exterior surface of the associated tubular portion. Thus, for example, for the cooling channel 194, the pressure side portion interior surface is formed by the exterior surface of the tubular portion 176; whereas the suction side portion interior surface is formed by the exterior surface of the tubular portion 174. Portions of the surfaces defining the portions of the cooling channel 196 are similarly formed by portions of the interior surfaces of the side walls and exterior surfaces of the tubular portions 178 and 176. Portions of the cooling channel 198 are similarly bounded by the side wall interior surfaces and an upstream/forward portion of the exterior surface of the tubular portion 180 for the pressure side portion and the exterior surface of the tubular portion 178 for the suction side portion.

As with the '323 publication, the cooling channel 194, 196, 198, may be arbitrarily divided across the mean line into two sections. Thus, for the Z section cooling channel each of these sections or subsections may be referred to as an L with the foot of the L forming the associated pressure side portion or suction side portion of the cooling channel and the leg of the L forming the associated half of the connecting/linking portion of the cooling channel.

Other variations may be as discussed in the '323 publication. For example, the directions of the Z may be reversed so that the suction side portion extends aft/downstream from the connecting portion and the pressure side portion projects forward/upstream. In alternative embodiments, one of the two L subsections may be reversed so that the Z-shape becomes a C-shape (effectively like the cooling channel 200 but with a more extensive connecting portion).

In other variations such as those discussed in the '323 publication, the two cooling channel halves/sub-portions (on either side of the mean) may have other shapes and may not be so symmetric. For example, two T-section sub-portions may form an I-section cooling channel just as two L-section sub-portions may form the Z-section or C-section cooling channel. In some cooling channels, one sub-portion may be T-section and the other L-section. In others, there may be no foot of an L or head/arms of a T such that the connecting portion extends from the mean line to adjacent the associated pressure or suction side but then does not extend forward/upstream or aft/downstream.

The locations of the connector arms 181, 182 determine the configuration of the cooling channels. The positions of the connector arms relative to the tubular portions determine the position and extent of the associated pressure side or suction side skin passageway portion (if any) of the continuous cooling channel and thus determine whether the overall continuous cooling channel (or half thereof) has a given footprint (e.g., I, T, Z, or some hybrid). As will also be discussed below, different configurations are selected to obtain different attributes with regard to stress levels, cooling schemes, and/or manufacturability.

The L-shape, T-shape, and l-shape are descriptive of the relative locations of the definitive sections, or "legs," of the portions pressure side half/portion and suction side half/portion of the cooling channel and do not imply orientations as to forward/backward or up/down in the linguistic sense. For instance, in an L-shape, the ends of the legs (or ends of leg and foot) meet to form a corner. In a T-shape, the end of a first leg (the leg or upright of the T) meets the second leg (head or pair of arms) at a location intermediate the ends of second leg. And an l-shape has a single leg that does not meet or intersect another leg. Such intersections or meetings are determined by midlines of the legs.

Combinations of the L-shape, T-shape, and l-shape for the pressure side half/portion and suction side half/portion generally produce one of five cross-sectional shape configurations for the cooling channel as a whole. For instance, the combination of the L-shape and the T-shape yields a J-configuration. The combination of the L-shape and the l-shape yields an L-configuration. The combination of the T-shape and the l-shape yields a T-configuration. The combination of two L-shapes yields either a C-configuration or a Z-configuration, depending on which way the two L-shapes face. Again, the designation of C-, Z-, L-, T-, or J- do not imply orientations (or senses) as to forward/backward or up/down in the linguistic sense.

Figure 9:
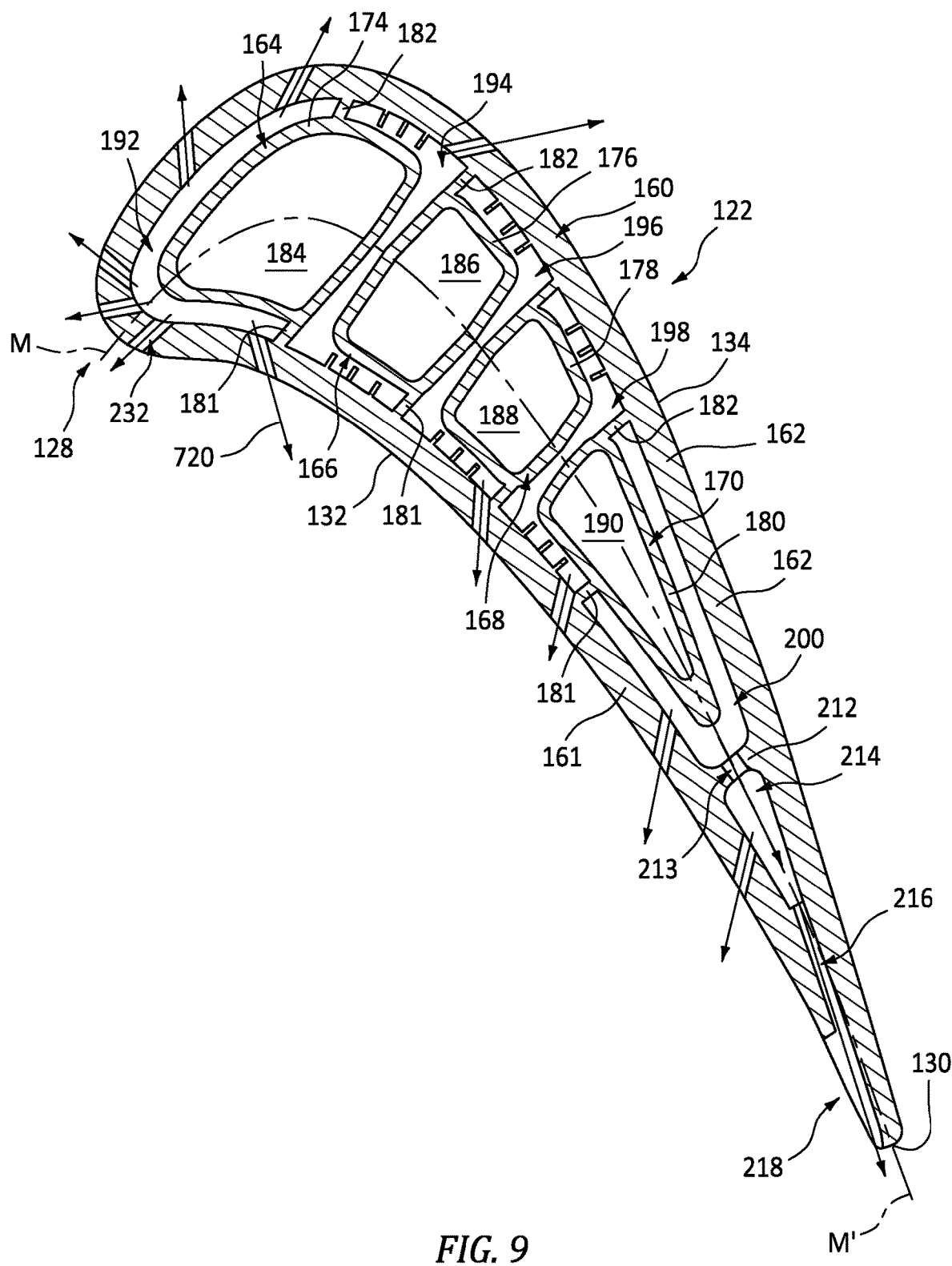
FIG. 9 is a cross-sectional view of a radial flow blade in operation with airflow.

As so far described, the example airfoil may correspond to one shown in the '323 publication. In particular, the illustrated example of FIG. 4 corresponds to an axial-flow variant of a blade wherein each half/sub-portion of the several cooling channels 194, 196, 198 has an L-shaped footprint. More particularly, the foot of each L-shaped half/portion is oppositely directed to the foot of the other L-shaped half/portion. Nevertheless, other variations including those designated with the letter "T" or a footless leg are possible. Additionally, for each of these, radial flow variants are possible. FIG. 9 shows a radial flow variation on the basic airfoil structure of FIG. 4. Feed differences (not shown) will typically involve more inlets and trunks in the root.

Additionally, as in the '323 publication, the tube portion walls 174, 176, 178, 180 may include ports 230 between their interior forming the rib passages 184, 186, 188, 190, and adjacent continuous cooling channels 192, 194, 196, 198, 200. Additionally, the airfoil wall 160 (FIG. 4) includes outlet passageways 232 (e.g., film cooling outlets) for discharging outlet flows 720 (drawings show exaggerated projection away from the airfoil surface as will form film cooling flows along the surface) from the continuous cooling channels 192, 194, 196, 198, and 200, and the trailing edge plenum 214. As is seen in FIG. 4, these are biased toward the pressure side with limited coverage on a leading portion of the suction side due to enhanced thermal loading on a trailing portion of the pressure side relative to a trailing portion of the suction side.

In an example blade, a single spanwise row of the holes/ports 230 adjacent the leading edge feed associated flows 722 to the cooling channel 192 from the rib passage 184. These split with a portion flowing along the pressure side of the cooling channel 192 and a portion flowing along the suction side. Film cooling outlet flows 720 pass from the cooling channel 192 on both the pressure side and suction side.

A second spanwise array of holes/ports 230 in the wall 174 adjacent an upstream/forward end of the suction side skin passageway portion of the cooling channel 194 feed associated airflows 724 to the cooling channel 194. Then the airflow 724 passes rearward through the suction side skin passageway portion through the intermediate/connecting portion across the median to the pressure side and then rearward through the pressure side skin passageway portion of the continuous cooling channel 194. In this particular embodiment, continuous cooling channel 194, in turn, feeds the rib passage 186 through a pressure side hole array 230 in the tubular portion 176.

As with the feeding of the continuous cooling channel 194, the continuous cooling channel 196 is fed via a suction side spanwise array of ports/holes in the tubular portion 176. The rib passage 188 feeds the continuous cooling channel 198 in a similar fashion. The tubular portion 180 has spanwise arrays of ports 230 on both pressure and suction side whose discharge flows merge to, in turn, pass through a spanwise array of apertures/holes/ports 213 in the wall 212 to the trailing edge plenum 214 (to, in turn, feed both the associated pressure side film cooling outlets and the trailing edge discharge slot 216). FIG. 4 also shows a discharge slot outlet flow 728.

Figure 5:
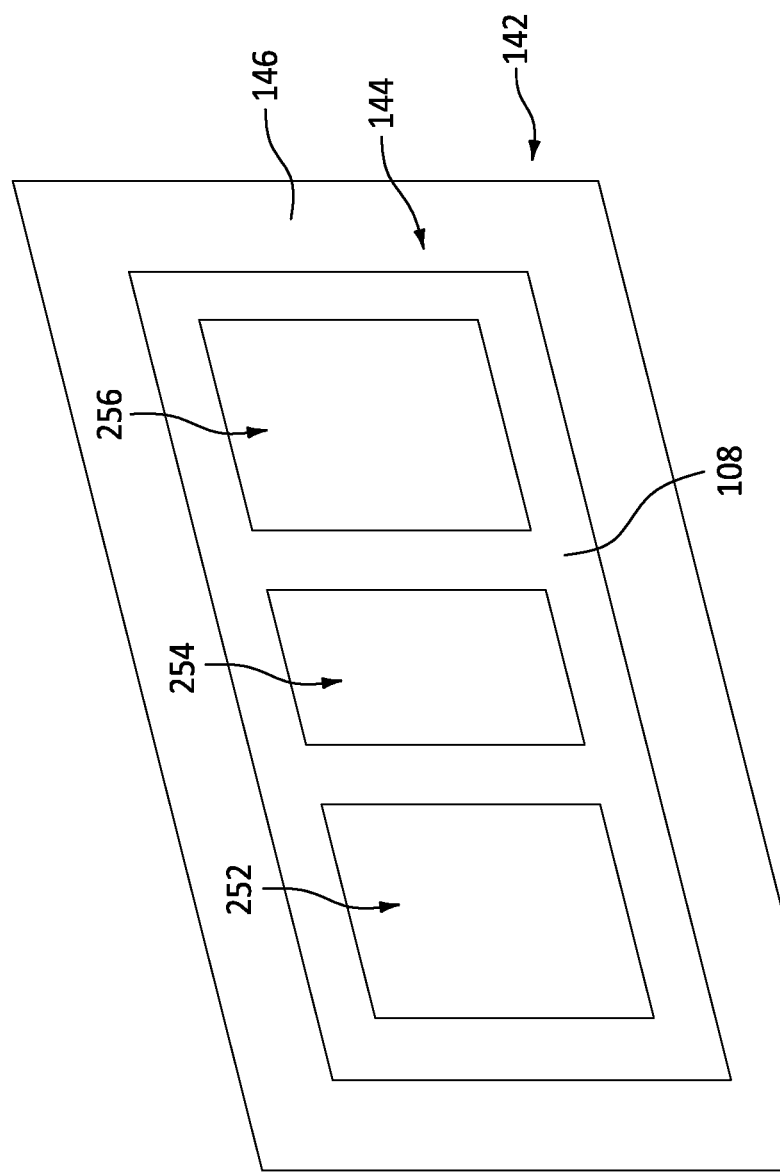
FIG. 5 is an inner diameter (ID) end view of a root of the turbine blade of FIG. 3.

FIG. 5 shows an inner diameter (ID) surface/end 108 of the root 144 having, from forward to aft three inlet ports 252, 254, and 256. These respectively feed inlet airflows 710, 712, and 714 to trunks 258, 260, and 262 (FIG. 3). In the illustrated example, the trunk 252 is continuous with and feeds the rib passage 184; the trunk 260 is continuous with and feeds the rib passage 188, and the trunk 262 is continuous with and feeds the rib passage 190. Nevertheless, other feed possibilities and configurations are possible. As discussed above, the port 252 and trunk 258 thus indirectly feed the continuous cooling channels 192 and 194 and the rib passage 186. The port 254 and trunk 260 thus indirectly feed the continuous cooling channel 198. The port 256 and trunk 262 thus indirectly feed the continuous cooling channel 200, the trailing edge plenum 214, and the discharge slot 216.

Figure 4A:
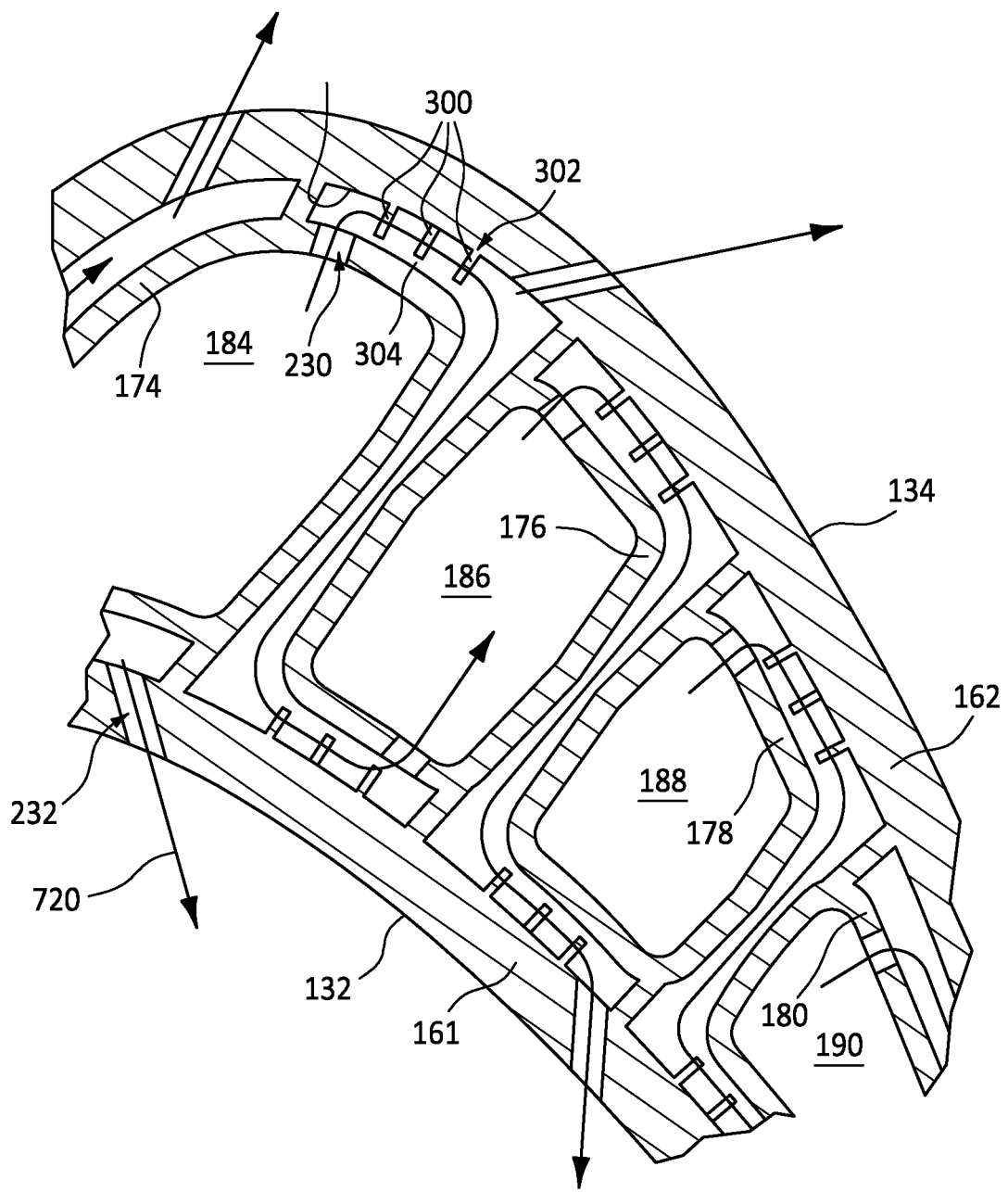
FIG. 4A is an enlarged view of a portion of the airfoil of FIG. 4.

As is discussed further below, relative to the '323 publication, the present airfoils add protrusions (pins or "pin fins", e.g., of circular cross-section such as right circular cylinders) 300 from at least one of the faces of one or more of the skin passageway portions. The example protrusions 300 (FIG. 4A) are on the outboard walls of the skin passageway portions of the cooling channels (the interior surface of the airfoil outer wall 160).

The example protrusions 300 for each subject skin passageway portion are in a regular array (or a reasonable approximation thereof given curvature and tapering of the skin passageway portions). Each protrusion has a proximal end 302 merging with the main portion of the airfoil wall inner surface (e.g., corresponding to surface retained from a baseline such as the '323 publication during modification to yield the present configuration). The protrusions each have inboard or distal ends 304. For at least some of the distal ends, the distal ends are in facing proximity spaced apart from the outer surface of the adjacent tube portion 174, 176, 178, 180. The spacing may be sufficient to avoid interference upon differential thermal expansion and mechanical operational loading.

In the illustrated embodiment, there are protrusions 300 on both the suction side skin passageway portions and the pressure side skin passageway portions. However, other implementations may have only one or may have some other combination such as only some of the skin passageway portions on one or both sides having protrusions.

In yet further variations, there may alternatively or additionally be protrusions from the tube portions outward toward the adjacent interior surface of the airfoil wall.

Figure 6:
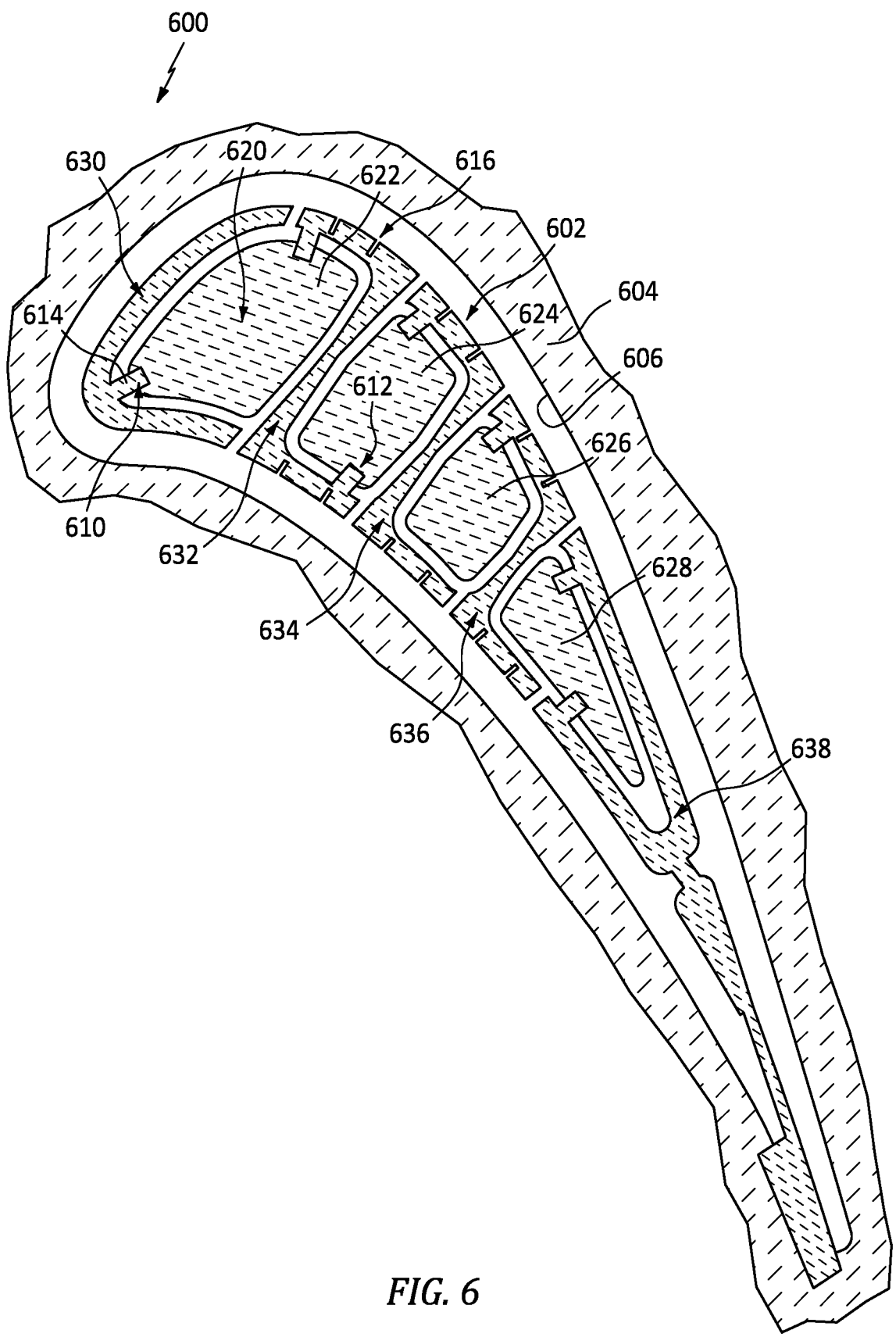
FIG. 6 is a cross-section of the axial flow blade of FIG. 4 during casting. FIG.

FIG. 6 shows a mold 600 formed by a shelled core assembly 602. The shell 604 has an interior surface 606 performing the exterior of the blade with the airfoil contour portion shown in FIG. 6. The example core assembly is shown as having nine separate cores or pieces assembled to each other. A main body core 620 has legs or sections 622, 624, 626, and 628 respectively corresponding to the rib passages 184, 186, 188, and 190 and thus shaped for casting such passages (and thus the corresponding interior surfaces of the associated tubular portions). In this example, each section 622, 624, 626, and 628 is initially formed (e.g., molded) as a separate piece. However, alternatives may combine one or more of these.

Additional cores (core pieces) 630, 632, 634, and 636 similarly respectively cast the cooling channels 192, 194, 196, and 198, and adjacent surface portions of the interior surface of the airfoil wall on the one hand and the exterior surfaces of the tubular portions on the other hand. A final core piece 638 casts the cooling channel 200, plenum 214, discharge slot 216, and the discharge slot outlets 218.

Each of the cores 630, 632, 634, 636, and 638 has one or more radial/spanwise array of projections (tabs) 610 having distal end portions received in blind compartments 612 in the respective legs of the main body core. In the illustrated example, the distal ends of the tabs 610 are shown bottomed out against bases of the associated compartments 612. The tabs have proximal portions 614 outside the compartment so as to hold the adjacent surfaces of the two associated cores spaced apart in order to cast the wall of the associated tubular portion. FIG. 6 also shows the cores 632, 634, 636 as having blind compartments (i.e., not through-holes) 616 (the protrusions and compartments are not shown to scale) for casting the complementary protrusions 300 of FIG. 4A.

Figure 8:
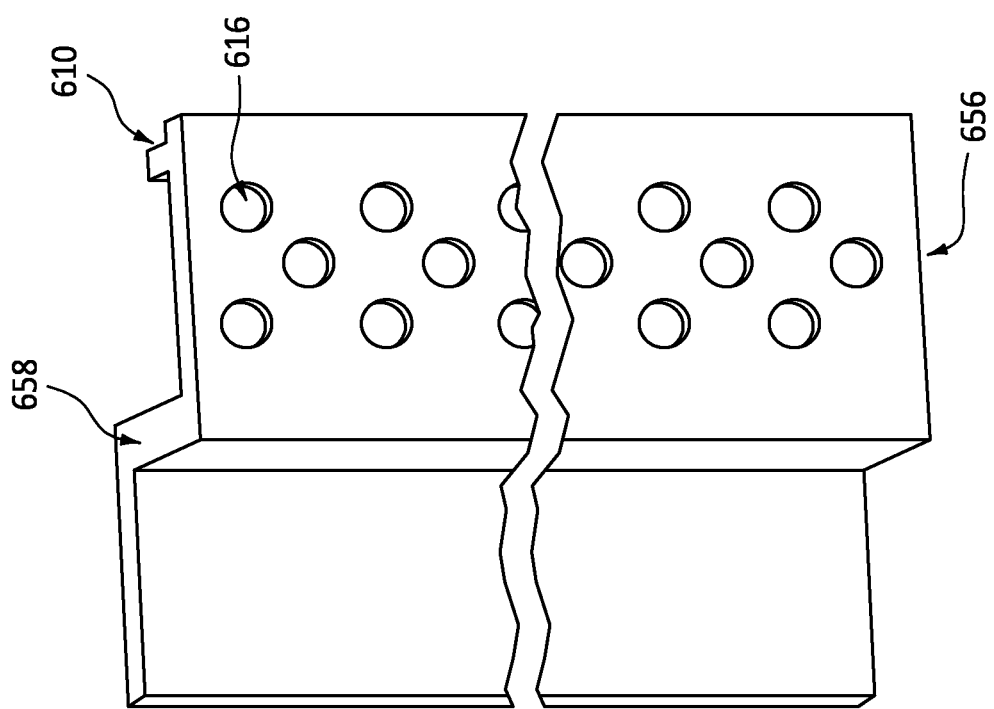
FIG. 8 is a second view of the casting core.
Figure 7:
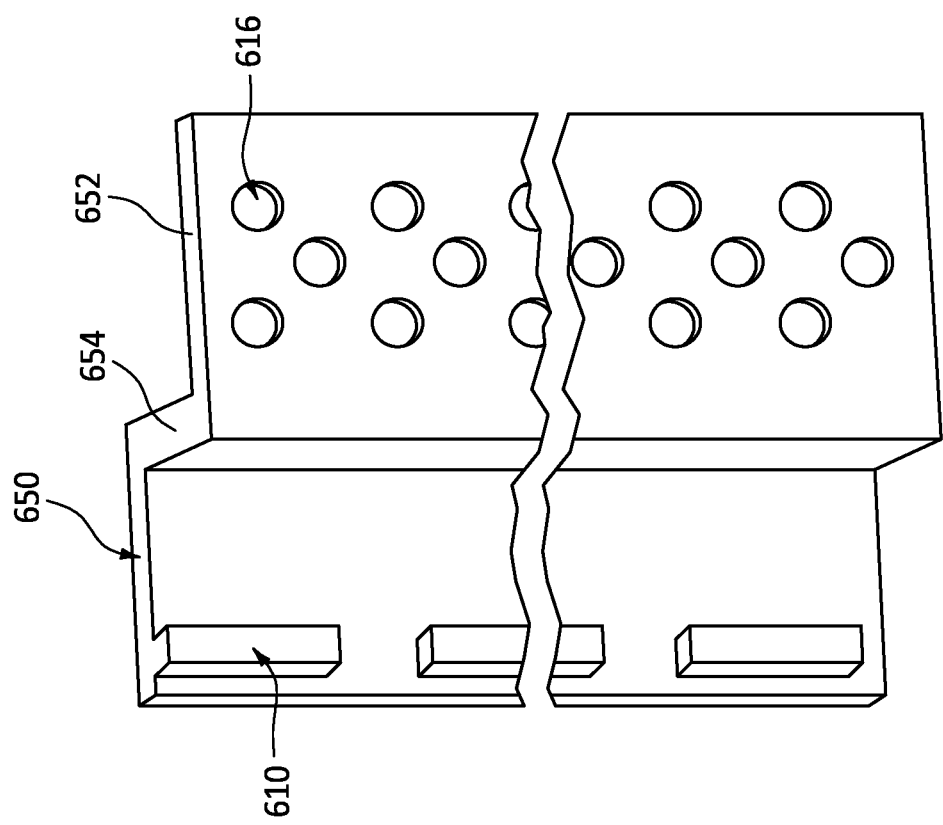
FIG. 7 is a first view of a casting core.

FIGS. 7 and 8 schematically show further details of the cores 634, 636, where FIG. 7 is a pressure side view and FIG. 8 is a suction side view of the same core. Each of these has a single spanwise row/array of tabs 610 for casting inlets to the associated passage 196, 198. The core 632 is similarly formed but also has an additional row/array of tabs 610 for casting outlets so as to feed the rib passage 186 from the rib passage 184 via the cooling channel 194. The example tabs 610 are shown as spanwise/radially elongate so that the corresponding ports in the associated tubular portions are spanwise elongate.

These cores each include an inlet end plate portion 650, an outlet end plate portion 652, and an intermediate/transition portion 654 joining the two. These core portions are shaped to correspond to associated cooling channel portions with the intermediate portion 654 spanning the mean line and the plate portions falling along the suction side and pressure side, respectively. Each of these cores extends from an inboard radial end 656 (near the airfoil inner end at the platform) to an outboard radial end 658 (near the tip).

The initial formation of the main body core in multiple pieces facilitates assembly of the cooling channel core pieces 630, 632, 634, 636, and trailing edge core piece 638 to the main body core. In an example assembly sequence, the cooling cores 630 and 632 are assembled to the leading main body core piece 620 with the tabs received in the associated main body core compartments. This and other assembly steps may include adhesive bonding. For example, prior to assembly the technician may apply adhesive (e.g., cyanoacrylate) to the compartments prior to tab insertion. Then, the first intermediate main body core piece 624 is assembled to the cooling core 632 with the associated tabs mated to the associated compartments. Then, the cooling core 634 is mated to the first intermediate core with the tabs received in the associated compartments. This creates a first (leading) subassembly.

In parallel or series with this, the cooling core 636 may be assembled to the main body core piece 626. This second subassembly may be placed adjacent to the larger first subassembly already created (e.g., the radially inboard/inlet ends of the main body core piece may be inserted into compartments in a pre-molded ceramic block (not shown that will embed in the ultimate shell inboard of the ultimate root).

Again, in parallel or series, a third subassembly may be formed by mating the cooling core 638 to the trailing main body core piece 628. Given the tabs and compartments at both the pressure side and suction side, this may involve some elastic flexing of the leading portion of the cooling core 638. Alternatively, because the pressure and suction side tabs and compartments are not at the same axial location and the main body core piece 628 tapers, the main body core piece 628 can be oriented a few degrees counterclockwise relative to its final resting position before sliding aft in-between the pressure and suction side skin passageways of cooling core 638 and rotated clockwise into its final resting position. Again, this subassembly may be placed adjacent the second subassembly in (e.g., in the block).

Other variations may reflect any of the different embodiments in the '323 publication. In radial flow embodiments (e.g., FIG. 9), there is not the same connection of cooling cores to main body cores. Accordingly, the cooling cores will typically be radially extended to have portions that extend to within the root and potentially beyond so as to form associated inlets.

As noted above, there may be further variations on the nature of any subassemblies. In one basic example, each of the example subassemblies above may be replaced by a unitary core. Such a unitary core may be molded using sacrificial inserts that correspond to some of the passageways/channels. Such sacrificial inserts may be plastic or other polymeric material that melts away or volatilizes such as during core firing. One technique for forming such a unitary core is seen in US Patent Application Publication No. 2011/0094698A1, Apr. 28, 2011, to Grunstra, and entitled "Fugitive Core Tooling and Method", (the '698 publication), the disclosure of which is incorporated by reference herein in its entirety as if set forth at length. Alternative techniques for manufacturing such unitary cores may include additive manufacture/3D printing.

FIGS. 7 and 8 show the compartments 616 in a regular array with three spanwise-extending rows spaced streamwise from each other from near the leading edge to the trailing edge. The compartments 616 of the leading and trailing rows are approximately spanwise/radially in-phase with each other and those of the intermediate row is shown essentially out-of-phase with the other two. Thus, the cut view of FIG. 6 does not show the intermediate rows. However, this is for purposes of illustration only and there may be variations in distribution. Thus, the protrusions 300 have a corresponding distribution to the compartments 616.

Among other variations are alternatively located pins or which may be alternatives to or additions to the illustrated pins. For example, recesses on the opposite faces of the plate portions of the Z cores may cast pins on the cold wall (the outer surfaces of the main body passageways). This may be alternative to or in addition to the hot wall pins. And there may be different such arrangements on different skin passageway sections of a given airfoil.

By having the pins on the hot wall (the outer wall interior surface (rather than the inner wall exterior surface or cold wall)) greater heat transfer may be expected because there will typically be a greater temperature difference between the outer wall and the air than between the inner wall and the air.

However, an advantage of cold wall pins is that drilling through the hot wall for film cooling outlets is less likely to intersect and damage a cold wall pin. If pins are on both surfaces, the potential for reduction in pin count on the hot wall (in favor of pins on the cold wall) still provides some advantageous heat transfer while freeing up space for drilling film cooling holes. Thus, film cooling hole placement may be one factor in determining the relative distribution of hot wall pins and cold wall pins so as to avoid drilling hot wall pins.

As noted above, the example has three streamwise distributed spanwise rows of pins per skin passageway section (pressure side or suction side). The example has the intermediate row out of phase with the others (e.g., about 180° out of phase, more broadly about 135° to 225°). But as noted, switching one to the tubular portion exterior surface would leave two rows on the side wall interior surface (e.g., FIG. 10). An example number of pins per row is at least eight (e.g., eight to eighty or twenty to eighty or thirty to sixty). An example number of rows (whether all on one surface or split between the sidewall interior surface and tubular portion exterior surface) is two to twenty, more particularly three to ten or three to eight. An example total count of pins per skin passageway section is at least sixteen, more particularly, sixteen to six hundred or fifty to five hundred or one hundred to four hundred.

A general advantage of having pins that do not bridge between the hot wall and cold wall (are unitarily formed with only one of the two facing surfaces of the Z-section cooling channel) is that it accommodates differential thermal expansion to avoid high stress. This preserves one advantage of the basic configuration of the '323 publication of decoupling the inner walls from the outer wall. Thus, by maintaining coupling of inner walls to outer walls only at one location on the pressure side and one location on the suction side, the airfoil can accommodate both differential thermal expansion of the inner walls to the outer wall and differential thermal expansion (if any) of the pressure side relative to the suction side. However, advantageously, to improve heat transfer, the pins locally extend at least halfway across the span between adjacent surfaces (the main portion of the interior surface of the pressure side or suction side wall on the one hand and the adjacent tubular section on the other hand). More particularly, it may be 50 to 90 percent or 50 to 75 percent (with alternative lower limits of 55% or 60% for each of those upper limits). Example pin transverse dimensions (e.g., diameters) are 0.4 mm to 2.5 mm, more particularly, 0.6 mm to 1.5 mm. Example pin heights are 0.4 mm to 2.5 mm, more particularly, 0.6 mm to 1.5 mm. An example gap between the top/end of the pins and the adjacent surface can range from 0.1 mm to 0.4 mm.

When there are pins on both the hot wall and adjacent cold wall (e.g., FIG. 10), the pins on the facing walls may be out of phase to create a more circuitous and higher heat transfer flowpath.

Figure 10:
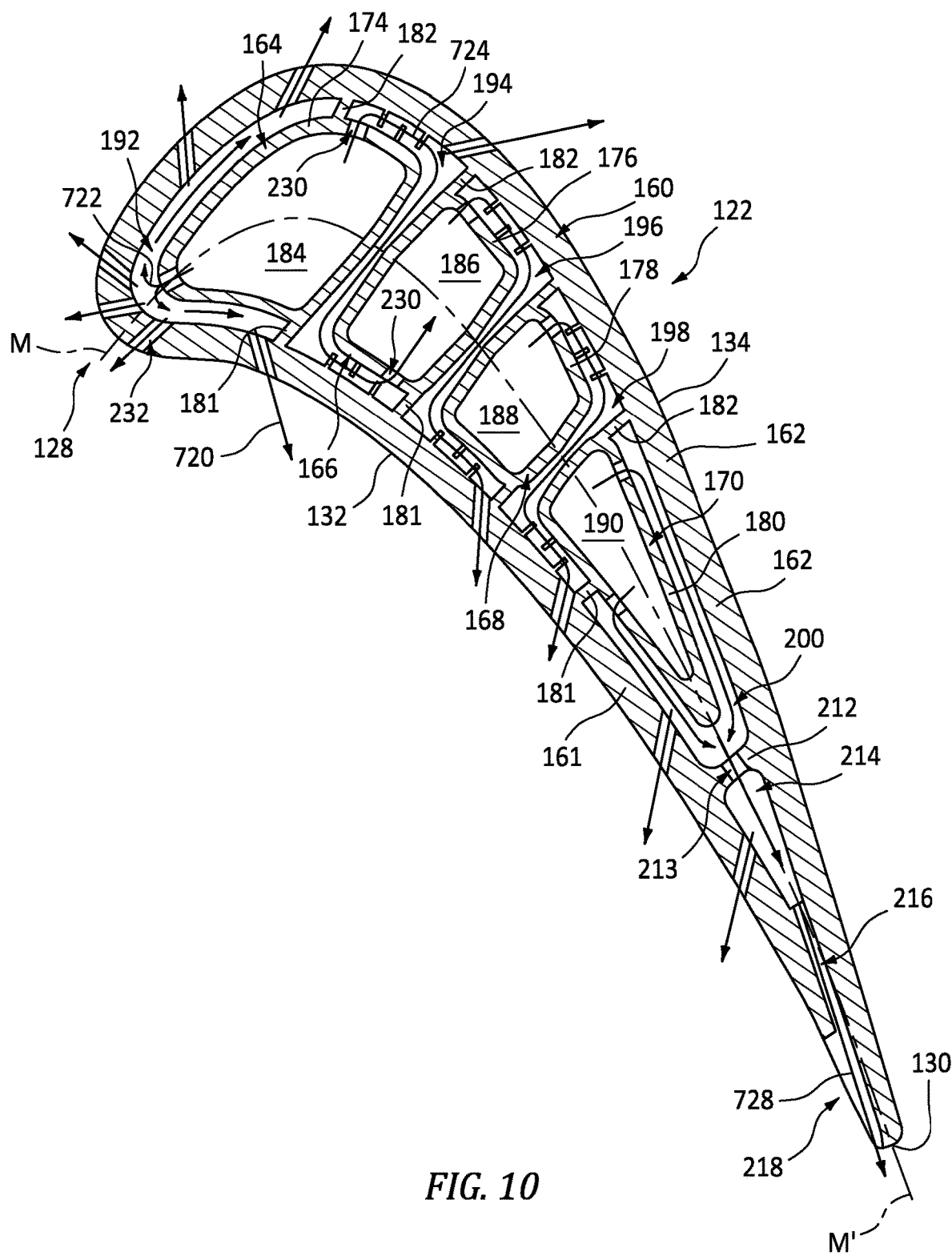
FIG. 10 is a cross-sectional view of an alternate axial flow blade in operation with airflow.

For example, modifying the pin array of the FIG. 4 embodiment to yield the FIG. 10 embodiment, the hot wall could lose the center pins 300 in the illustrated array and pins in those positions could be located on the cold wall (e.g., a single spanwise row in the example).

Other variations attend pin shape and orientation. For example, the illustrated pins may be right circular cylindrical pins with flat tops parallel and spaced apart from the adjacent wall surface. Alternatives could have rounded ends (e.g., including hemispherical pins forming bumps).

Alternative pin footprints to circular could include square or rhomboidal footprints, elliptical footprints, elongate obround footprints, and convoluted footprints such as star, clover, or the like (which provide increased surface area for heat transfer with trade-off involving flow restriction).

Additionally, although a single regular array of pins is shown, the pin shape, distribution, spacing, and the like may be varied within a given passageway leg to tailor heat transfer to local needs.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline airfoil passageway configuration, details of such baseline may influence details of particular implementations. Accordingly, other embodiments are within the scope of the following claims.

What is claimed is:

1. An airfoil element comprising:
   an airfoil wall defining a leading end, a trailing end, a pressure side, a suction side, and a mean line from the leading end to the trailing end that is equidistant from the pressure side and the suction side; and
   first and second ribs each connecting the pressure side and the suction side, each of the first and second ribs defining:
      a tube portion circumscribing a rib passage; and
      first and second connector arms joining the tube portion to, respectively, the pressure side and the suction side,
   wherein:
      the first rib, the second rib, and the airfoil wall bound a continuous cooling channel therebetween, the continuous cooling channel having a pressure side portion to the pressure side of the mean line and a suction side portion to the suction side of the mean line;
      at least one of the pressure side portion and the suction side portion includes a skin passageway between at least one of the respective tube portions of the first rib and second rib and an adjacent portion of an interior surface of the airfoil wall;
      said skin passageway has an outer surface formed by said adjacent portion and an inner surface formed by said at least one of the respective tube portions; and
      at least one of the outer surface and the inner surface has a plurality of protrusions into the skin passageway.

2. The airfoil element of claim 1 wherein:
   the tube portion of at least one of the first and second ribs has fore and aft tube wall sections, a pressure side tube wall section, and a suction side tube wall section forming a rounded-corner quadrilateral shape in cross-section; and/or
   the tube portion of each of the first and second ribs has a pressure side tube wall section, a suction side tube wall section, and an additional section linking the pressure side section and the suction side section, the additional section of the first rib tube portion and the additional section of the second rib tube portion facing each other.

3. The airfoil element of claim 1 wherein:
   the outer surface and the inner surface each have said plurality of protrusions into the skin passageway internested so that ends of the outer surface protrusions extend into the airfoil deeper than ends of adjacent inner surface protrusions.

4. The airfoil element of claim 1 wherein:
   the skin passageway is a suction side said skin passageway of the suction side portion; and
   the pressure side portion has a pressure side said skin passageway.

5. The airfoil element of claim 4 wherein:
   the suction side skin passageway is between the tube portion of the first rib and the airfoil wall; and
   the pressure side skin passageway is between the tube portion of the second rib and the airfoil wall.

6. The airfoil element of claim 4 further comprising:
   at least one film cooling outlet hole through the airfoil wall from the second skin passageway portion.

7. The airfoil element of claim 4 wherein:
   the pressure side portion and the suction side portion are each of L-shaped cross-section;
   streamwise oppositely directed feet of the L-shaped cross section respectively form the pressure side skin passageway and suction side skin passageway; and
   legs of the L-shaped cross-section join each other to form a linking portion linking the pressure side skin passageway and suction side skin passageway between the tube portions of the first and second ribs.

8. The airfoil element of claim 1 further comprising:
   at least one feed hole through the tube portion of the first rib to the continuous cooling channel.

9. The airfoil element of claim 8 further comprising:
   at least one film cooling outlet hole through the airfoil wall from the continuous cooling channel.

10. The airfoil element of claim 8 further comprising:
    at least one feed hole through the tube portion of the second rib from the continuous cooling channel.

11. The airfoil element of claim 1 being a blade having:
    a root; and
    a platform between the root and the airfoil.

12. A gas turbine engine including a plurality of the airfoil element of claim 1 in a turbine section and further comprising:
    a compressor section;
    a combustor in fluid communication with the compressor section; and
    said turbine section in fluid communication with the combustor.

13. A method for manufacturing the airfoil element of claim 1, the method comprising:
    assembling a first casting core to one or more feedcores wherein:

the first casting core has:
  a first section for casting the skin passageway;
  a second section for casting portions of the continuous cooling channel between the respective tube portions of the first rib and the second rib; and
  a plurality of recesses in the first section;
overmolding a sacrificial pattern material to an assembly of the first casting core and the one or more feedcores;
shelling the overmolded casting core assembly to form a shell; and
casting alloy in the shell wherein during the casting the plurality of recesses cast the plurality of protrusions.

14. The method of claim 13 further comprising:
molding the first casting core and the one or more feedcores;
removing the sacrificial pattern material before the casting; and
deshelling and decoring after the casting.

15. A method for using the airfoil element of claim 1, the method comprising:
passing an airflow into the continuous cooling channel; and
passing an outlet airflow from the continuous cooling channel through a film cooling outlet in the airfoil wall.

16. The method of claim 15 further comprising:
passing an airflow from the continuous cooling channel to the second rib's rib passage.

17. The method of claim 15 wherein:
the passing an airflow into the continuous cooling channel from the first rib's rib passage.

18. An airfoil element comprising:
an airfoil wall defining a leading end, a trailing end, a pressure side, a suction side, and a mean line from the leading end to the trailing end that is equidistant from the pressure side and the suction side;
a plurality of main body passageways along the mean line; and
a plurality of cooling passageways each having:
  a pressure side skin passageway;
  a suction side skin passageway; and
  a linking portion between and linking the pressure side skin passageway and the suction side skin passageway and between two of the main body passageways,
wherein:
  a surface of at least one of the pressure side skin passageway and the suction side skin passageway has a plurality of protrusions.

19. The airfoil element of claim 18 wherein:
the surface is opposite an inner surface of the airfoil wall.

20. The airfoil element of claim 18 wherein:
the surface is an inner surface of the airfoil wall.

21. A casting core assembly for casting an airfoil element, the airfoil element comprising:
an airfoil wall defining a leading end, a trailing end, a pressure side, a suction side, and a mean line from the leading end to the trailing end that is equidistant from the pressure side and the suction side;
one or more feedcores each having one or more spanwise legs for casting main body passages along the mean line; and
a first casting core having:
  a first section for casting a skin passageway of a cooling channel;
  a second section for casting a portion of the cooling channel between two of the main body passages; and
  a plurality of recesses in the first section.

\* \* \* \* \*